US009087525B2

(12) United States Patent
Lu et al.

(10) Patent No.: US 9,087,525 B2
(45) Date of Patent: Jul. 21, 2015

(54) LAYERED SYNTHETIC ANTI-FERROMAGNETIC UPPER SHIELD

(71) Applicant: Seagate Technology LLC, Cupertino, CA (US)

(72) Inventors: Zhengqi Lu, Londonderry (GB); Daniel Hassett, Newtown Cunningham (IE); Paula McElhinney, Londonderry (GB); Jiansheng Xu, Londonderry (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/067,456

(22) Filed: Oct. 30, 2013

(65) Prior Publication Data

US 2015/0116868 A1 Apr. 30, 2015

(51) Int. Cl.
*G11B 5/11* (2006.01)
*G11B 5/33* (2006.01)

(52) U.S. Cl.
CPC ... *G11B 5/11* (2013.01); *G11B 5/33* (2013.01)

(58) Field of Classification Search
CPC .............. G11B 5/11; G11B 5/10; G11B 5/39; G11B 5/3929; G11B 21/24
USPC ................. 360/319, 245.3, 324.12, 245, 324, 360/324.11
See application file for complete search history.

(56) References Cited

U.S. PATENT DOCUMENTS

| | | | | |
|---|---|---|---|---|
| 4,019,205 A * | 4/1977 | Salmond et al. | ........... | 360/98.06 |
| 5,172,282 A * | 12/1992 | Ghose | .......... | 360/78.12 |
| 6,115,215 A * | 9/2000 | Adams et al. | ............ | 360/264.4 |
| 6,414,821 B1 * | 7/2002 | Tokuyama et al. | ........ | 360/254.8 |
| 6,628,469 B1 * | 9/2003 | Hoyt | .............. | 360/69 |
| 6,693,773 B1 * | 2/2004 | Sassine | ..................... | 360/254.9 |
| 7,848,057 B1 * | 12/2010 | Shukla | ........ | 360/254.3 |
| 8,028,311 B2 * | 9/2011 | Gilovich | ...................... | 720/699 |
| 8,144,437 B2 * | 3/2012 | Miyauchi et al. | ........ | 360/324.12 |
| 8,179,642 B2 * | 5/2012 | Kawamori et al. | ........... | 360/319 |
| 8,451,567 B2 * | 5/2013 | Zhou et al. | .............. | 360/324.12 |
| 8,456,778 B2 * | 6/2013 | Min et al. | ................. | 360/125.03 |
| 8,958,172 B1 * | 2/2015 | Hansen | ..................... | 360/98.01 |
| 2001/0033459 A1 * | 10/2001 | Boutaghou | ............... | 360/254.3 |
| 2003/0002221 A1 * | 1/2003 | Mayne | ...................... | 360/254.7 |
| 2004/0013880 A1 | 1/2004 | Daughton et al. | | |
| 2004/0075932 A1 * | 4/2004 | Watson | .......................... | 360/69 |
| 2005/0240953 A1 * | 10/2005 | Awano | .......................... | 720/670 |
| 2006/0022227 A1 | 2/2006 | Horng et al. | | |
| 2006/0044663 A1 * | 3/2006 | Stiles et al. | ..................... | 360/69 |
| 2006/0044668 A1 * | 3/2006 | Cho | ............................. | 360/75 |
| 2006/0103991 A1 * | 5/2006 | Hoshino et al. | .......... | 360/324.12 |
| 2007/0008653 A1 * | 1/2007 | Ohno et al. | ................ | 360/254.3 |
| 2008/0094757 A1 * | 4/2008 | Duvall et al. | .............. | 360/254.7 |
| 2008/0316875 A1 * | 12/2008 | Chan | .......................... | 369/44.11 |

(Continued)

*Primary Examiner* — Allen T Cao
(74) *Attorney, Agent, or Firm* — HolzerIPLaw, PC

(57) ABSTRACT

A magneto-resistive (MR) sensor may include a variety of individual functional layers whereby an electrical resistance throughout the layers of the sensor stack varies according to the polarity of a pinned layer within the sensor stack. A layered synthetic anti-ferromagnetic (SAF) upper shield of the MR sensor includes an upper SAF layer and a lower SAF layer separated by a shield anti-ferromagnetic (AFM) layer. The lower SAF layer is in contact with a side shield of the MR sensor, which provides a side shield biasing field to the MR sensor. The upper SAF layer separates the lower SAF layer from a top shield and/or domain control structure (DCS) magnet(s) of the MR sensor and shields the lower SAF layer and the sensor stack from DCS stray field(s), thereby reducing noise.

19 Claims, 5 Drawing Sheets

(56) References Cited

U.S. PATENT DOCUMENTS

| | | | |
|---|---|---|---|
| 2009/0002868 A1* | 1/2009 | Mallary et al. | 360/55 |
| 2009/0002893 A1* | 1/2009 | Tsuchiya et al. | 360/245.3 |
| 2009/0067086 A1* | 3/2009 | Kaneko et al. | 360/98.01 |
| 2009/0135529 A1* | 5/2009 | Shimazawa et al. | 360/319 |
| 2009/0201612 A1* | 8/2009 | Shimazawa et al. | 360/245 |
| 2011/0007427 A1* | 1/2011 | Qiu et al. | 360/319 |
| 2011/0122528 A1* | 5/2011 | Burness | 360/98.07 |
| 2012/0147504 A1* | 6/2012 | Zhou et al. | 360/324.12 |
| 2012/0281319 A1 | 11/2012 | Singleton et al. | |
| 2012/0295132 A1* | 11/2012 | Min et al. | 428/812 |
| 2014/0037861 A1* | 2/2014 | Min et al. | 427/548 |
| 2014/0252518 A1* | 9/2014 | Zhang et al. | 257/422 |

* cited by examiner

LAYERED SYNTHETIC ANTI-FERROMAGNETIC UPPER SHIELD

BACKGROUND

In order to improve magnetic storage device performance, capabilities, and price per unit of data storage, magnetic media areal density continues to increase. Smaller and smaller magnetic sensors are needed to accurately read data from the increasingly dense magnetic media. However, as the magnetic sensors shrink, variations in the magnetization direction of the magnetic layer(s) of the magnetic sensors increase. Structures that maintain or improve the stabilization of the magnetic layer(s) of the magnetic sensors within the increasingly smaller overall magnetic sensor packaging requirements are disclosed below.

SUMMARY

Implementations described and claimed herein address the foregoing problems by providing a sensor stack and a sensor shield including a first synthetic anti-ferromagnetic (SAF) layer anti-ferromagnetically coupled to a second SAF layer.

Other implementations are also described and recited herein.

BRIEF DESCRIPTIONS OF THE DRAWINGS

DETAILED DESCRIPTIONS

Magnetoresistive (MR) devices such as giant magnetoresistive (GMR) or tunneling magnetoresistive (TMR) devices are used in magnetic storage systems to detect magnetically encoded information stored on a magnetic storage medium, such as a magnetic disc. More specifically, a time dependent magnetic field from a magnetic medium modulates a resistivity on a MR device as the magnetic medium moves in close proximity to the MR device. A change in resistance through the MR device may be detected by passing current through the MR device and measuring a voltage drop across the MR device. The resulting voltage signal may be used to recover the encoded information from the magnetic medium.

One example implementation of a GMR device is a spin valve. This spin valve includes a non-magnetic spacer layer positioned between a ferromagnetic pinned reference layer and a ferromagnetic free layer. Magnetization of the pinned reference layer is fixed in a predetermined direction, while the magnetization of the free layer rotates freely in response to an external magnetic field (e.g., one generated by a magnetic medium located in close proximity to the spin valve). Spin valves may be configured to operate in either current-in-plane (CIP) or current-perpendicular-to-plane (CPP) modes. In a CIP mode, sense current is passed through the spin valve in a direction generally parallel to the individual layers of the spin valve. In a CPP mode, sense current is passed through the spin valve in a direction generally perpendicular to the individual layers of the spin valve.

TMR devices are similar in structure to CPP spin valves, but operate in a different manner. TMR devices utilize a barrier layer in place of the spacer layer between the free layer and the pinned reference layer of the spin valves referenced above. Electrons tunnel through the barrier layer to conduct current through the TMR devices. A sensing current flowing generally perpendicular to the individual layers of a TMR device experiences a resistance that is proportional to the cosine of an angle formed between the magnetization direction of the free layer and the magnetization direction of the pinned reference layer.

The presently disclosed technology may be applied to MR devices generally, and specifically to GMR devices, TMR devices, and spin valves, for example. Further, the presently disclosed technology may be applied to MR devices operating in a CIP mode or a CPP mode.

A reader stack (i.e., a stack of the individual functional layers of the GMR device) is typically located between shields made of soft magnetic materials such as NiFe and CoNiFe. These soft magnetic materials have low magnetic anisotropy (Hk) and low coercivity, which serve to shield the individual layers from magnetic interference from other devices or components and from adjacent magnetic domains on a magnetic medium.

Figure 1:
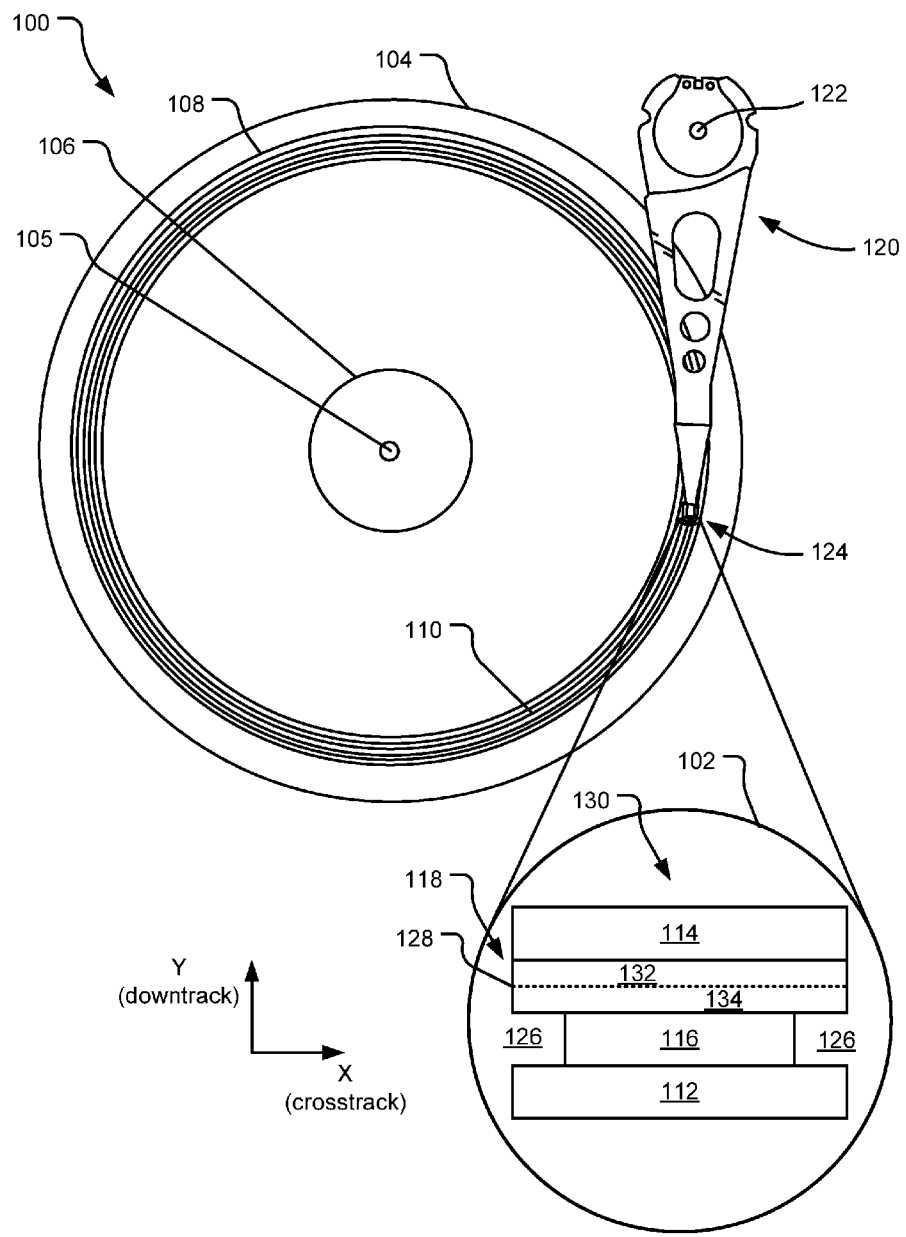
FIG. 1 illustrates a plan view of a data storage device having a magneto-resistive (MR) sensor with an example layered synthetic anti-ferromagnetic (SAF) upper shield.

FIG. 1 illustrates a plan view of a data storage device 100 having a magneto-resistive (MR) sensor 130 with an example layered synthetic anti-ferromagnetic (SAF) upper shield 118. Although other implementations are contemplated, in the illustrated implementation, the data storage device 100 includes a storage medium 104 (e.g., a magnetic data storage disc) on which data bits can be recorded using a magnetic write pole and from which data bits can be read using the MR sensor 130. The storage medium 104 rotates about a spindle center or a disc axis of rotation 105 during rotation, and includes an inner diameter 106 and an outer diameter 108 between which are a number of concentric data tracks (e.g., track 110). It should be understood that the described technology may be used with a variety of storage formats on the storage medium 104, including continuous magnetic media, discrete track (DT) media, and shingled media, for example.

Information may be written to and read from data bit locations on the data tracks using a transducer head assembly 124 that is mounted on an actuator assembly 120 at an end distal to an actuator axis of rotation 122. The transducer head assembly 124 flies in close proximity above a surface of the storage medium 104 during disc rotation. Further, the actuator assembly 120 may rotate during a seek operation about the actuator axis of rotation 122. The seek operation positions the transducer head assembly 124 over a target data track for read and write operations.

A detail view 102 schematically illustrates an air-bearing surface (ABS) view of the MR sensor 130. The MR sensor 130 includes a sensor (or reader) stack 116 located between a bottom shield 112 and a top shield 114 in a down-track direction (i.e., the y-direction) of the MR sensor 130. The sensor stack 116 includes a number of individual functional layers of the MR sensor 130 that are discussed in more detail with regard to FIG. 2. The bottom shield 112 and the top shield 114 each have a low magnetic anisotropy (Hk) and low coercivity, which serves to shield the sensor stack 116 from noise and magnetic interference from nearby devices or components (e.g., domain control structure (DCS) magnets (not shown) and from down-track/up-track magnetic domains on the storage medium 104.

The sensor stack 116 is also located between side shields 126 in a cross-track direction (i.e., the x-direction) of the MR sensor 130. The side shields 126 also have low coercivity, which serves to shield the sensor stack 116 from magnetic interference from noise and magnetic interference from other nearby devices or components and from cross-track magnetic domains on the storage medium 104.

The MR sensor 130 also includes the layered SAF upper shield 118. The layered SAF upper shield 118 includes at least an upper SAF layer 132 and a lower SAF layer 134 separated by a shield anti-ferromagnetic (AFM) layer 128. The lower SAF layer 134 is in contact with the side shields 126, which provides a side shield biasing field. The layered SAF upper shield 118 has much higher magnetic anisotropy than a conventional single NiFe alloy layer, while keeping low coercivity. This can improve the overall stability of the MR sensor 130. The upper SAF layer 132 separates the lower SAF layer 134 from the DCS magnets (not shown) of the data storage device 100 and shields the lower SAF layer 134 and the sensor stack 116 from DCS stray field(s), for example, thereby reducing noise.

While the various layers of the MR sensor 130 are depicted with similar thicknesses in FIG. 1, the actual thickness may vary widely. Example thicknesses of some of the layers are provided with reference to FIGS. 3 and 4, which are described in detail below.

Figure 2:
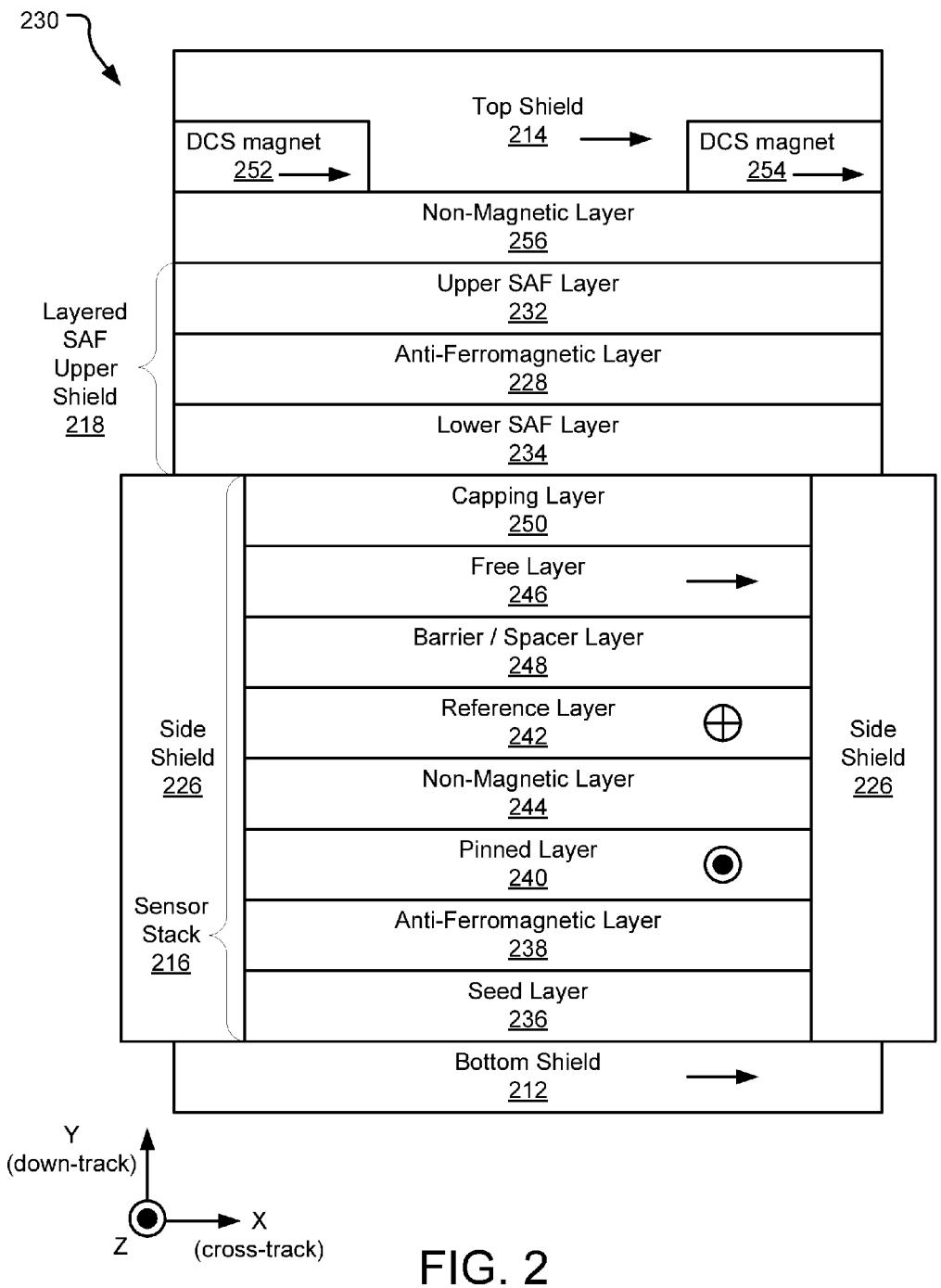
FIG. 2 illustrates an MR sensor with an example layered SAF upper shield.

FIG. 2 illustrates an MR sensor 230 with an example layered SAF upper shield 218. The MR sensor 230 is depicted as viewed from an ABS of an adjacent magnetic storage medium (not shown). The MR sensor 230 includes a sensor (or reader) stack 216 located between a bottom shield 212 and a top shield 214 in a down-track direction (i.e., the y-direction) of the MR sensor 230. The sensor stack 216 includes a number of individual functional layers of the MR sensor 230 discussed in more detail below. The bottom shield 212 and the top shield 214 each have low magnetic anisotropy and coercivity, which serves to shield the sensor stack 216 from noise and magnetic interference from nearby devices or components (e.g., DCS magnets 252, 254) and from down-track/up-track magnetic domains. Further, the magnetic polarity of the bottom shield 212 and the top shield 214 each are each fixed in the cross-track direction, as illustrated by arrows oriented in the x-direction.

The sensor stack 216 is also located between side shields 226 in a cross-track direction (i.e., the x-direction) of the MR sensor 230. The side shields 226 also have low coercivity, which further serves to shield the sensor stack 216 from noise and magnetic interference from nearby devices or components and from cross-track magnetic domains. The shields 212, 214, 226 may be made of a low coercivity materials, such as soft magnetic metals like NiFe and CoNiFe, for example.

The MR sensor 230 is typically built using thin-film manufacturing techniques starting from the bottom shield 212. Further, the MR sensor 230 may go through a magnetic anneal process to set the magnetic orientations of the various layers of the MR sensor 230 and shown in FIG. 2 and described in detail below.

A seed layer 236 is deposited on the bottom shield 212 is order to promote the texture and the grain growth of a sensor AFM layer 238, which is subsequently grown on top of the seed layer 236. The seed layer 236 is chosen such that its atomic structure (or arrangement) corresponds with a preferred crystallographic direction of the AFM layer 238 and other layers of the sensor stack 216. The seed layer can be made of a non-magnetic metal or metal alloy (e.g., Ta, Ru, Cr, Pt, Pd, and NiCr) or a magnetic metal or metal alloy (e.g., NiFeCr, NiFeW, NiFeMo). If a magnetic metal or metal alloy is used from the seed layer 236, it may further enhance an exchange field bias between the AFM layer 238 and a pinned layer 240 and reduce 50% pulse width (PW50).

The sensor AFM layer 238 is deposited beneath the pinned layer 240 to prevent the pinned layer 240 from rotation. AFM materials exhibiting this property are termed pinning materials (e.g., PtMn, IrMn, NiMn, FeMn, CrPtMn, CrNiMn, or CrFeMn). The pinned layer 240 may be made of a soft magnetic material that would otherwise freely rotate in polarity without the sensor AFM layer 238 fixing the polarization of (or "pinning") the pinned layer 240. The pinned layer 240 has a magnetic polarity fixed in the z-direction (or perpendicular to the magnetic storage medium) by the AFM layer 238.

A magnetic reference layer 242 has a polarity 180 degrees from the pinned layer 240 in order to provide another reference for a polarity switch to a free layer 246, which is discussed in further detail below. As such, the magnetic reference layer 242 has a magnetic polarity fixed in the negative z-direction. Further, the magnetic reference layer 242 is separated from the pinned layer 240 by a non-magnetic layer 244, which allows for anti-ferromagnetic coupling of the magnetic reference layer 242 and the pinned layer 240. In various implementations, the non-magnetic layer 244 may be made of Ru, Cu, Cr, and/or Mo, for example.

Still further, the reference layer 242 is separated from the free layer 246 by a non-magnetic barrier or spacer layer 248, which allows for the different polarities of the magnetic reference layer 242 and the free layer 246. If acting as a barrier layer, layer 248 may be made of $Al_2O_3$, TiO, TaO, MgO, or other oxides, for example. If acting as a spacer layer, layer 248 may be made of Cu, Ag, and Au, for example.

The free layer 246 is initially polarized parallel to the bottom shield 212 and the top shield 214 polarities (i.e., in the cross-track direction, parallel to the storage medium ABS), as illustrated by arrow oriented in the x-direction. However, magnetization of the free layer 246 rotates freely in response to an external magnetic field (e.g., one generated by the magnetic medium oriented in close proximity to the MR sensor 230). Due to the perpendicular fields of the pinned layer 240 and the magnetic reference layer 242, the free layer 246 will coherently rotate 180 degrees between an anti-parallel magnetic orientation to the reference layer 242 and a parallel magnetic orientation to the reference layer 242 depending on the external magnetic field. In various implementations, each of the pinned layer 240, the reference layer 242 and the free layer 246 are made of a soft ferromagnetic or synthetic ferromagnetic material, such as CoFe, NiFe, CoNiFe, and CoFeB. The sensor stack 216 is finished with a capping layer 250 (e.g., a Ru layer, a Ta layer, or a Ru/Ta bilayer) that seals off any pores in the structure of the free layer 246 or other layers of the sensor stack 216.

Electrical resistance through the MR sensor 230 depends on the relative magnetic orientation of the free layer 246 and the reference layer 242. More specifically, resistance through the MR sensor 230 generally in the negative z-direction is at a maximum when the magnetic orientation of the free layer 246 is anti-parallel to the magnetic orientation of the reference layer 242. Resistance through the MR sensor 230 generally in the z-direction is at a minimum when the magnetic orientation of the free layer 246 is parallel to the magnetic orientation of the reference layer 242. The magnetic orientation of magnetic domains on the magnetic storage medium effect changes in magnetic polarity of the free layer 246 between parallel and anti-parallel, allowing the MR sensor 230 to read data from the magnetic storage medium by passing a current through the MR sensor 230 and detecting resistance changed through the MR sensor 230.

The MR sensor 230 also includes the layered SAF upper shield 218 between the sensor stack 216 and the top shield 214. The layered SAF upper shield 218 yields improved top shield 214 stabilization using the increased magnetic anisotropy from the layered SAF upper shield 218. More specifically, the layered SAF upper shield 218 overall has a magnetic moment that responds linearly to stray field(s) from the magnetic storage medium and absorbs the stray field(s) without interfering with the magnetic orientations of the free layer 246, magnetic reference layer 242, and the pinned layer 240. Further, the high magnetic anisotropy of the layered SAF upper shield 218 provides domain stability to the MR sensor 230. Still further, the SAF upper shield 218 is a part of an overall shield structure of the MR sensor 230 and therefore does not increase shield-to-shield spacing.

The layered SAF upper shield 218 includes at least an upper SAF layer 232 and a lower SAF layer 234 separated by a shield AFM layer 228. The lower SAF layer 234 is in contact with the side shields 226, which provides a side shield biasing field. The upper SAF layer 232 separates the lower SAF layer 234 from DCS magnets 252, 254 and shields the lower SAF layer 234 and the sensor stack 216 from DCS stray field(s), thereby reducing noise.

The layered SAF upper shield 218 is separated from the top shield 214 and the DCS 252, 254 by a non-magnetic layer 256, which allows for the differing polarities of the layered SAF upper shield 218 and the top shield 214/DCS 252, 254. The non-magnetic layer 256 may be made of one or more of Cu, Ag, Al, Au, Pt, Pd, Ru, Ta, Cr, Mo, and various alloys thereof (e.g., NiCr) with a thickness less than 40 nm. In other implementations, the non-magnetic layer 256 is omitted.

In additional implementations, the layered SAF upper shield 218 may include more than two anti-ferromagnetically coupled SAF layers. In other implementations, the layered SAF shield 218 operates as a top shield without the top shield 214 and/or DCS magnet(s) 254. In further implementations, a layered SAF shield may be placed between the sensor stack 216 and the bottom shield 212 instead of or in addition to the layered SAF upper shield 218. Still further, a layered SAF shield may replace the bottom shield 212. While the various layers of the MR sensor 230 are depicted with similar thicknesses in FIG. 2, the actual thickness may vary widely. Example thicknesses of some of the layers are provided with reference to FIGS. 3 and 4, which are described in detail below.

Figure 3:
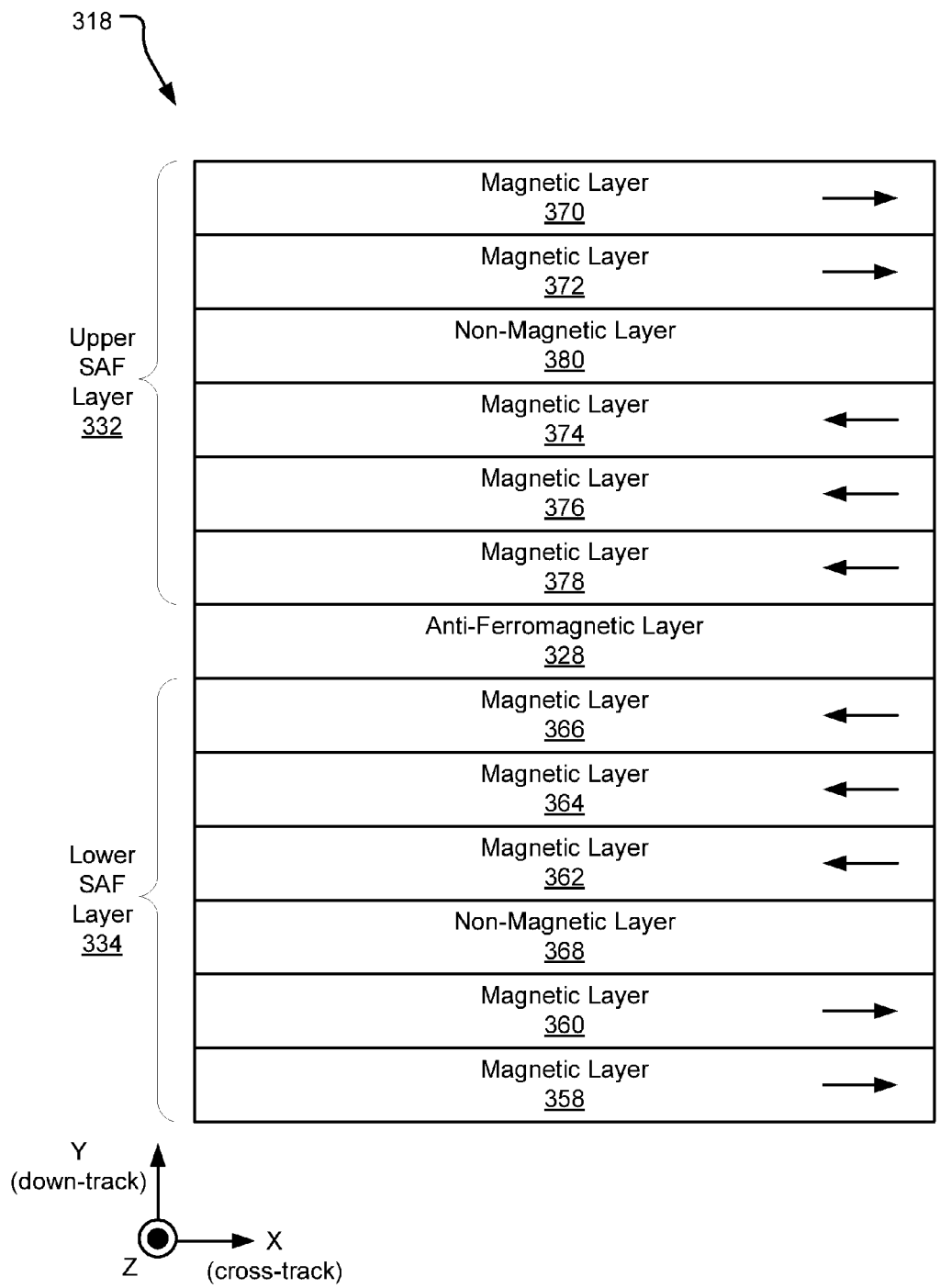
FIG. 3 illustrates a first example layered SAF upper shield.

FIG. 3 illustrates a first example layered SAF upper shield 318. The layered SAF upper shield 318 includes at least an upper SAF layer 332 and a lower SAF layer 334 separated by a shield AFM layer 328. The lower SAF layer 334 is in contact with the side shields (not shown), which provides a side shield biasing field. The upper SAF layer 332 separates the lower SAF layer 334 from DCS magnets (not shown) and shields the lower SAF layer 334 and a corresponding sensor stack (not shown) from DCS stray field(s), thereby reducing noise.

The lower SAF layer 334 is a laminate structure of several magnetic layers 358, 360, 362, 364, 366 separated by a non-magnetic layer 368. The magnetic layers 358, 360 have an x-direction cross-track polarity and the magnetic layers 362, 364, 366 have a negative x-direction cross-track polarity. The magnetic layers 358, 360 are dipole coupled to the magnetic layers 362, 364, 366 across the non-magnetic layer 368, which creates the anti-parallel magnetic alignment between the magnetic layers 358, 360 and the magnetic layers 362, 364, 366.

Similarly, the upper SAF layer 332 is a laminate structure of several additional magnetic layers 370, 372, 374, 376, 378 separated by one additional non-magnetic layer 380. The magnetic layers 370, 372 have an x-direction cross-track polarity and the magnetic layers 374, 376, 378 have a negative x-direction cross-track polarity. The magnetic layers 370, 372 are dipole coupled to the magnetic layers 374, 376, 378 across the non-magnetic layer 380, which creates the anti-parallel magnetic alignment between the magnetic layers 370, 372 and the magnetic layers 374, 376, 378. The AFM layer 328 pins the magnetization of both the upper SAF layer 332 and the lower SAF layer 334 parallel to a media ABS, as illustrated by arrows oriented in the cross-track direction (x-direction and negative x-direction).

In various implementations, magnetic layers 358, 364, 370, 376 are each made of one or more of NiFe, NiFeCr, NiFeMo, NiFeW, CoNiFe, and CoFeNiB with thicknesses ranging from 5 nm to 60 nm. Magnetic layers 360, 362, 366, 372, 374, 378 are each made of one or more of CoFe, CoFeB, and CoNiFe with thicknesses ranging from 0.5 nm to 10 nm. The non-magnetic layers 368, 380 are an anti-ferromagnetic coupling layers that are each made of one or more of Cu, Cr, Ag, Ru, and Mo with thicknesses ranging from 0.3 nm to 1 nm. The anti-ferromagnetic layer 328 is made of one or more of PtMn, IrMn, NiMn, FeMn, CrPtMn, CrIrMn, CrNiMn, and CrFeMn with a thickness ranging from 4 nm to 15 nm.

In an example implementation, the lower SAF layer 334 is a laminate of the following materials with the following thicknesses. Magnetic layer 358 is NiFe at 25 nm thick, magnetic layer 360 is CoFe at 2 nm thick, non-magnetic layer 368 is Ru at 0.82 nm thick, magnetic layer 362 is CoFe at 2 nm thick, magnetic layer 364 is NiFe at 25 nm thick, and magnetic layer 366 is CoFe at 2 nm thick. The upper SAF layer 332 is a laminate of the following materials with the following thicknesses. Magnetic layer 370 is NiFe at 20 nm thick, magnetic layer 372 is CoFe at 2 nm thick, non-magnetic layer 380 is Ru at 0.82 nm thick, magnetic layer 374 is CoFe at 2 nm thick, magnetic layer 376 is NiFe at 18 nm thick, and magnetic layer 378 is CoFe at 2 nm thick. The anti-ferromagnetic layer 328 is IrMn at 7 nm thick. Such an example layered SAF upper shield 318 may have a magnetic anisotropy (Hk) greater than 400 Oe (e.g., 510 Oe to 610 Oe or approximately 560 Oe) and a saturated magnetic field magnitude (e.g., 95% saturated) greater than 900 Oe (e.g., 1050 Oe to 1350 Oe or approximately 1200 Oe).

Figure 4:
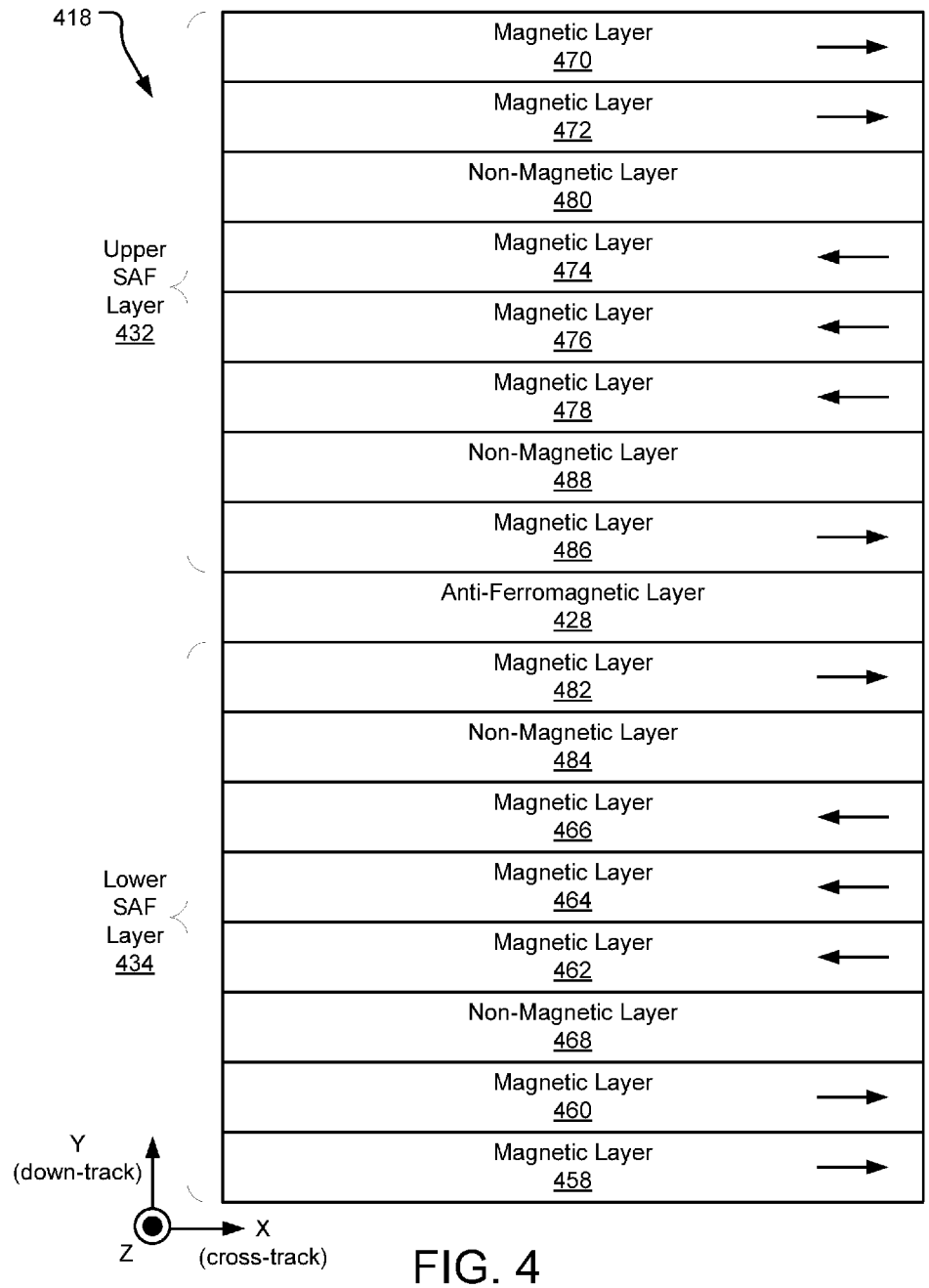
FIG. 4 illustrates a second example layered SAF upper shield.

FIG. 4 illustrates a second example layered SAF upper shield 418. The layered SAF upper shield 418 includes at least an upper SAF layer 432 and a lower SAF layer 434 separated by a shield AFM layer 428. The lower SAF layer 434 is in contact with the side shields (not shown), which provides a side shield biasing field. The upper SAF layer 432 separates the lower SAF layer 434 from the DCS magnets (not shown) and shields the lower SAF layer 434 and a corresponding sensor stack (not shown) from DCS stray field(s), thereby reducing noise.

The lower SAF layer 434 is a laminate structure of several magnetic layers 458, 460, 462, 464, 466, 482 separated by non-magnetic layers 468, 484. The magnetic layers 458, 460 have an x-direction cross-track polarity and the magnetic layers 462, 464, 466 have a negative x-direction cross-track polarity. The magnetic layers 458, 460 are dipole coupled to the magnetic layers 462, 464, 466 across the non-magnetic layer 468, which creates the anti-parallel magnetic alignment between the magnetic layers 458, 460 and the magnetic layers 462, 464, 466. The magnetic layer 482 has an x-direction cross-track polarity and is dipole coupled to the magnetic layers 462, 464, 466 across the non-magnetic layer 484, which creates the anti-parallel magnetic alignment between the magnetic layer 482 and the magnetic layers 462, 464, 466.

Similarly, the upper SAF layer 432 is a laminate structure of several additional magnetic layers 470, 472, 474, 476, 478, 486 separated by additional non-magnetic layers 480, 488. The magnetic layers 470, 472 have an x-direction cross-track polarity and the magnetic layers 474, 476, 478 have a negative x-direction cross-track polarity. The magnetic layers 470, 472 are dipole coupled to the magnetic layers 474, 476, 478 across the non-magnetic layer 480, which creates the anti-parallel magnetic alignment between the magnetic layers 470, 472 and the magnetic layers 474, 476, 478. The magnetic layer 486 has an x-direction cross-track polarity and is dipole coupled to the magnetic layers 474, 476, 478 across the non-magnetic layer 488, which creates the anti-parallel magnetic alignment between the magnetic layer 486 and the magnetic layers 474, 476, 478. The AFM layer 428 pins the magnetization of both the upper SAF layer 432 and the lower SAF layer 434 parallel to a media ABS, as illustrated by arrows oriented in the cross-track direction (x-direction and negative x-direction).

In various implementations, magnetic layers 458, 464, 470, 476 are each made of one or more of NiFe, NiFeCr, NiFeMo, NiFeW, CoNiFe, and CoFeNiB with thicknesses ranging from 5 nm to 60 nm. Magnetic layers 460, 462, 466, 472, 474, 478 are each made of one or more of CoFe, CoFeB, and CoNiFe with thicknesses ranging from 0.3 nm to 10 nm. Magnetic layers 482, 486 are each made of one or more of CoFe, CoFeB, and CoNiFe with thicknesses ranging from 1 nm to 10 nm. The non-magnetic layers 468, 480, 484, 488 are an anti-ferromagnetic coupling layers that are each made of one or more of Cu, Cr, Ag, Ru, and Mo with thicknesses ranging from 0.3 nm to 1 nm. The AFM layer 428 is made of one or more of PtMn, IrMn, NiMn, FeMn, CrPtMn, CrIrMn, CrNiMn, and CrFeMn with a thickness ranging from 5 nm to 15 nm.

In an example implementation, the lower SAF layer 434 is a laminate of the following materials with the following thicknesses. Magnetic layer 458 is NiFe at 25 nm thick, magnetic layer 460 is CoFe at 2 nm thick, non-magnetic layer 468 is Ru at 0.82 nm thick, magnetic layer 462 is CoFe at 2 nm thick, magnetic layer 464 is NiFe at 25 nm thick, magnetic layer 466 is CoFe at 2 nm thick, non-magnetic layer 484 is Ru at 0.82 nm thick, magnetic layer 482 is CoFe at 5 nm thick. The upper SAF layer 432 is a laminate of the following materials with the following thicknesses. Magnetic layer 470 is NiFe at 20 nm thick, magnetic layer 472 is CoFe at 2 nm thick, non-magnetic layer 480 is Ru at 0.82 nm thick, magnetic layer 474 is CoFe at 2 nm thick, magnetic layer 476 is NiFe at 18 nm thick, magnetic layer 478 is CoFe at 2 nm thick, non-magnetic layer 488 is Ru at 0.82 nm thick, magnetic layer 486 is CoFe at 5 nm thick. The anti-ferromagnetic layer 428 is IrMn at 7 nm thick. Such an example layered synthetic anti-ferromagnetic upper shield 418 may have a magnetic anisotropy (Hk) greater than 400 Oe (e.g., 730 Oe to 830 Oe or approximately 780 Oe) and a saturated magnetic field magnitude (e.g., 95% saturated) greater than 900 Oe (e.g., 1600 Oe to 1800 Oe or approximately 1700 Oe).

Figure 5:
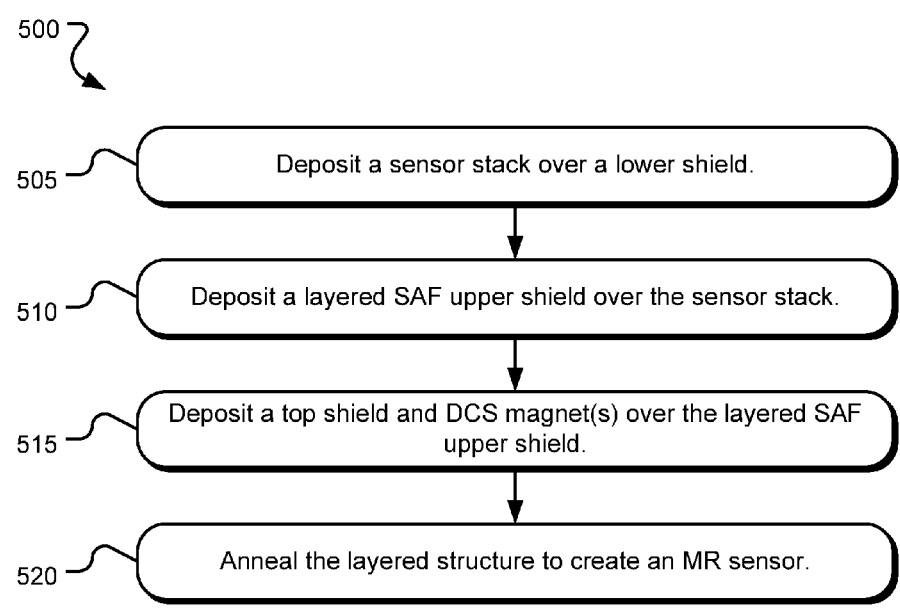
FIG. 5 illustrates example operations for manufacturing a MR sensor with a layered SAF upper shield.

FIG. 5 illustrates example operations 500 for manufacturing a MR sensor with a layered SAF upper shield. A first deposition operation 505 deposits a sensor stack over a lower shield. The sensor stack includes a variety of individual layers as described with regard to FIG. 2, for example. The sensor stack includes functional layers of the overall MR sensor whereby an electrical resistance throughout the layers of the sensor stack varies according to the polarity of a pinned layer within the sensor stack.

A second deposition operation 510 deposits a layered SAF upper shield over the sensor stack. The layered SAF upper shield includes at least an upper SAF layer and a lower SAF layer separated by a shield AFM layer. The lower SAF layer is in contact with a side shield, which provides a side shield biasing field to the MR sensor. The upper SAF layer separates the lower SAF layer from a subsequently deposited top shield and/or DCS magnet(s) and shields the lower SAF layer and the sensor stack 216 from DCS stray field(s), thereby reducing noise.

A third deposition operation 515 deposits the top shield and/or DCS magnet(s) over the layered SAF upper shield. Deposition of the top shield completes the MR sensor. In some implementations, a non-magnetic spacer layer is deposited between the layered SAF upper shield and the top shield. Further, one or more DCS magnets may be deposited as a part of the top shield. An annealing operation 520 anneals the layered structure to create the MR sensor. The annealing operation 520 sets the magnetic orientations of the various layers of the MR sensor as shown and described with respect to FIGS. 2-4 above.

The logical operations making up the embodiments of the invention described herein are referred to variously as operations, steps, objects, or modules. Furthermore, it should be understood that logical operations may be performed in any order, adding and omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A magneto-resistive (MR) sensor comprising:
a sensor stack; and
a sensor shield including a first synthetic anti-ferromagnetic (SAF) layer anti-ferromagnetically coupled to a second SAF layer,
the first SAF layer and the second SAF layer separated by a non-synthetic anti-ferromagnetic (AFM) layer that anti-ferromagnetically couples the first SAF layer and the second SAF layer,
wherein the MR sensor is a magnetic reader for magnetic storage medium.

2. The MR sensor of claim 1, wherein a magnetic polarity of the sensor shield is pinned in a direction parallel to an air-bearing surface of the MR sensor by the non-synthetic AFM layer.

3. The MR sensor of claim 1, further comprising:
a side shield in contact with the first SAF layer that provides a biasing field that stabilizes a free layer of the sensor stack.

4. The MR sensor of claim 1, wherein the second SAF layer shields the sensor stack from domain control structure (DCS) magnet noise.

5. The MR sensor of claim 1, wherein the second SAF layer separates a DCS magnet from the first SAF layer.

6. The MR sensor of claim 1, wherein each of the first SAF layer and the second SAF layer includes three magnetic layers dipole coupled to two magnetic layers across a non-magnetic layer.

7. The MR sensor of claim 1, wherein each of the first SAF layer and the second SAF layer includes three magnetic layers dipole coupled to two magnetic layers across a first non-magnetic layer and the three magnetic layers also coupled to a single magnetic layer across a second non-magnetic layer.

8. The MR sensor of claim 1, further comprising:
a top shield, wherein the sensor shield is an upper shield located between the sensor stack and the top shield.

9. The MR sensor of claim 8, further comprising:
a non-magnetic layer located between the top shield and the upper shield.

10. The MR sensor of claim 1, wherein the non-synthetic AFM layer pins magnetization of the sensor shield parallel to an air bearing surface of a magnetic storage medium.

11. The MR sensor of claim 1, wherein magnetic anisotropy of the sensor shield exceeds 400 Oe.

12. The MR sensor of claim 1, wherein 95% saturated magnetic field magnitude of the sensor shield exceeds 900 Oe.

13. A method of making a magneto-resistive (MR) sensor comprising:
depositing a sensor stack over a substrate; and
depositing a sensor shield by depositing a non-synthetic anti-ferromagnetic (AFM) layer between a first synthetic anti-ferromagnetic (SAF) layer and a second SAF layer that anti-ferromagnetically couples the first SAF layer and the second SAF layer.

14. The method of claim 13, further comprising:
depositing a side shield in contact with the first SAF layer that provides a biasing field that stabilizes a free layer of the sensor stack.

15. The method of claim 13, further comprising:
depositing one or both of a top shield and a domain control structure (DCS) magnet over the sensor shield.

16. The method of claim 15, further comprising:
depositing a non-magnetic layer between the top shield and the upper shield.

17. A magneto-resistive (MR) sensor comprising:
a sensor stack;
a side shield;
a first synthetic anti-ferromagnetic (SAF) layer deposited over the sensor stack and in contact with the side shield;
an anti-ferromagnetic (AFM) layer deposited over the first SAF layer;
a second SAF layer deposited over the AFM layer, wherein the first SAF layer and the second SAF layer are anti-ferromagnetically coupled by the AFM layer;
a non-magnetic layer deposited over the second SAF layer; and
a top shield deposited over the non-magnetic layer.

18. A magneto-resistive (MR) sensor comprising:
a sensor stack; and
a sensor shield including a first synthetic anti-ferromagnetic (SAF) layer anti-ferromagnetically coupled to a second SAF layer,
a top shield, wherein the sensor shield is an upper shield located between the sensor stack and the top shield, and
a non-magnetic layer located between the top shield and the upper shield.

19. The MR sensor of claim 18, further comprising:
a side shield in contact with the first SAF layer that provides a biasing field that stabilizes a free layer of the sensor stack.

* * * * *